(12) United States Patent
Kweeder

(10) Patent No.: US 8,106,116 B2
(45) Date of Patent: *Jan. 31, 2012

(54) PRE-FIBER GEL COMPOSITIONS AND MATERIALS, METHODS OF MANUFACTURE AND USES THEREOF

(75) Inventor: James A. Kweeder, Chester, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/851,363

(22) Filed: Aug. 5, 2010

(65) Prior Publication Data

US 2010/0324180 A1 Dec. 23, 2010

Related U.S. Application Data

(63) Continuation of application No. 10/716,584, filed on Nov. 18, 2003, now Pat. No. 7,790,789.

(51) Int. Cl.
*C08K 5/3412* (2006.01)
*C08K 5/3415* (2006.01)
*C08K 5/3432* (2006.01)

(52) U.S. Cl. .............. 524/98; 524/86; 524/99; 524/104; 524/602

(58) Field of Classification Search .......... 524/602, 524/98, 86, 99, 104
See application file for complete search history.

(56) References Cited

U.S. PATENT DOCUMENTS

| | | | | |
|---|---|---|---|---|
| 4,745,143 | A | * | 5/1988 | Mason et al. ............ 524/98 |
| 5,047,459 | A | * | 9/1991 | Walde .................... 524/100 |
| 5,223,196 | A | * | 6/1993 | Shridharani et al. ...... 264/78 |
| 2002/0099136 | A1 | | 7/2002 | Park et al. |

FOREIGN PATENT DOCUMENTS

| | | | |
|---|---|---|---|
| GB | 1476997 | | 6/1977 |
| GB | 2274109 | * | 7/1994 |

OTHER PUBLICATIONS

Antec 1993 Conference Proceedings, New Orleans May 9-13, 1993, vol. 1, p. 470-473.
Antec 1994 Conference Proceedings, New Orleans May 1-5, 1994, vol. 1, p. 116-122.
First/Consequent Examination Report, Application No. 2862/DELNP/2006, Government of India Patent Office, Feb. 25, 2011.
Notice of Office Action, Application No. 10-2006-7012190, Korean Intellectual Property Office, May 18, 2011.

* cited by examiner

*Primary Examiner* — Kriellion Sanders
(74) *Attorney, Agent, or Firm* — Sandra P. Thompson; Buchalter Neiner

(57) ABSTRACT

A pre-fiber gel material is described herein that includes: a) at least one amide-based and/or polyamide-based composition; and b) at least one lactam gelling agent, wherein the gel composition has sufficient viscosity and sufficient cohesiveness upon the mixing of the at least one amide-based or polyamide-based polymer and the at least one lactam gelling agent that the composition can be spun into a fiber. In addition, methods are provided herein that teach that the production of a pre-fiber gel composition, including: a) providing at least one amide-based compound; b) providing at least one lactam gelling agent; and c) mixing the at least one amide-based polymer and the at least one lactam gelling agent such that there is sufficient viscosity and to sufficient cohesiveness in the composition so that it can be spun into a fiber.

21 Claims, No Drawings

PRE-FIBER GEL COMPOSITIONS AND MATERIALS, METHODS OF MANUFACTURE AND USES THEREOF

FIELD OF THE SUBJECT MATTER

The field of the subject matter herein is pre-fiber gel materials and compositions, fiber products, yarn products and carpet products, methods of manufacture and uses thereof.

BACKGROUND

Fibers for consumer use and the constituents that make up those fibers, especially fibers and polymers that are incorporated into carpet products and fabrics/textiles, are constantly being evaluated for improvements with respect to the durability and strength. These improvements may relate to tensile strength and tensile properties, quality, durability. Fibers and fiber products are also being evaluated to determine if there are more efficient and cost-effective manufacturing processes and equipment.

Most polymer processing does not only shape polymer into the desired shape (eg: injection molding, film blowing, fiber spinning, etc.). The processing is usually designed to impart desirable properties to the finished article by manipulation of the polymer molecules during the forming operation. For example, film blowing is carefully designed to combine the proper degree of stretching during the cooling of the molten polymer. This stretching orients the polymers improving strength and toughness of the film. Fiber is drawn during the cooling stage to control the degree of crystallization in the finished yarn.

Simple melt processing of polymers has distinct limitations. Since the manipulation is carried out during the brief period of solidification, practical limitations exist on how much molecular orientation can be achieved and/or how much shape manipulation can realized before the polymer is too cool to accomplish either. To be processed, the polymer must melt, the molecules freed-up for orientation, but still be sufficiently viscous and cohesive to hold together in the processing (a concept commonly called "melt strength"). These requirements restrict the molecular weights of the polymer that can be employed.

To overcome the restrictions imposed by the brief period of solidification, the polymer can be alternatively treated with a solvent material to produce a physical state that is in ways similar to the period during solidification. The polymer can be processed during that period to impart properties and/or shapes not achievable from simple melt processing. Gel-spun polyethylene has been exploited for the production of ballistic fibers.

Despite the obvious processing benefits of solvent gellation, very few examples have been explored. While the concept can be straightforward, successful implementation can be more difficult. The solvent-polymer system must achieve a gel that has sufficient solvation of the polymer molecules to manipulate the microstructure while still having sufficient melt strength to be processed into useful shapes. Once the article has been made, the solvent is typically removed to bring the polymer to its full properties. Solvent removal and recovery presents numerous cost and equipment issues to extract and dry the polymer and then recycle or otherwise dispose of the spent solvents. Industrial hygiene and environmental issues further complicate implementation. It is understandable why this technology has been limited to very high value materials like ballistic fibers.

For example, there is no recognized solvent system for gel processing of polyamide 6 (also known as nylon-6 or polycaprolactam). Standard solvents like formic acid yield a solution far too low in viscosity for processing. Further, if nylon-6 gel processed products are to compete in applications other than high-cost ballistic fibers, a suitable solvent that is low-cost to implement is required. One candidate for gel processing nylon-6 products that has not been investigated is the epsilon-caprolactam monomer used to make nylon-6.

Caprolactam and nylon compounds have each been individually polymerized with the same compounds (i.e. caprolactam/caprolactam or nylon/nylon) by anionic polymerization in a twin-screw extruder and then tested for residual monomer content and therma/mechanical properties. In both methods, however, the polymerization process used was not designed to and did not result in a pre-fiber gel composition that could be processed by any means (including extrusion), and there was no indication that the mechanical strength or thermal strength was improved by the single monomer/twin-screw extruder mixing process. (see Antec '93 Conference Proceedings, New Orleans, 9-13 May 1993, Vol. 1, p. 470-473; and Antec '94 Conference Proceedings, San Francisco, Calif., 1-5 May 1994, Vol. 1, p. 116-22)

It was also known that caprolactam formed solutions with nylon-6, but these solutions took the form of residual, unpolymerized monomer found in the polymer. Typically nylon-6 resin is leached to remove this residual monomer. Deliberate addition of caprolactam for gel processing has not been previously considered. Gel processing and gel compositions are important because polymer parts have a practical limit in cross-section size due to the difficulty in forming such large cross-sections via melt processing. From a practical perspective, machines (extruders) to form polymer into shapes and sizes routinely available in metal simply do not exist. The other real limitation is that as melted polymer cools, significant shrinkage occurs. One can often find puckers on molded parts from shrink. To an extent, shrink can be compensated with clever mold design and tuning the molding process.

Therefore, it would be desirable to produce a pre-fiber gel material and/or composition that a) has sufficient viscosity and suitable cohesiveness such that it can be spun into a fiber or yarn, b) can be processed by any processing method, including extrusion, and c) can be incorporated into the production of a fiber, a fiber product, a yarn product and/or a carpet product. It would also be desirable to produce the pre-fiber gel material and/or composition at temperatures that are at or below normal processing temperatures for a polymer or monomer-based fiber product.

SUMMARY OF THE SUBJECT MATTER

A pre-fiber gel material is described herein that includes: a) at least one amide-based and/or polyamide-based composition; and b) at least one lactam gelling agent, wherein the gel composition has sufficient viscosity and sufficient cohesiveness upon the mixing of the at least one amide-based or polyamide-based polymer and the at least one lactam gelling agent that the composition can be spun into a fiber.

In addition, methods are provided herein that teach that the production of a pre-fiber gel composition, including: a) providing at least one amide-based compound; b) providing at least one lactam gelling agent; and c) mixing the at least one amide-based polymer and the at least one lactam gelling agent such that there is sufficient viscosity and sufficient cohesiveness in the composition so that it can be spun into a fiber.

DETAILED DESCRIPTION

A pre-fiber gel material and/or composition has been developed that a) has sufficient viscosity and suitable cohesiveness such that it can be spun into a fiber or yarn, b) can be processed by any processing method, including extrusion, and c) can be incorporated into the production of a fiber, a fiber product, a yarn product and/or a carpet product. Contemplated pre-fiber gel materials and/or compositions can also be processed at temperatures that are at or below normal processing temperatures for a polymer and/or monomer based fiber product.

The formation of a pre-fiber gel composition and/or material allows for the control of the properties of the drawn fiber by allowing for more favorable orientation of the polymer molecules in the fiber. Controlling the molecule orientation can lead to increased tensile strength and overall fiber durability. Furthermore, at least part of the at least one gelling agent (such as a lactam gelling agent) can be removed and recovered from the spun fiber once formed. In addition, any unpolymerized monomers can be subsequently polymerized after further processing to create properties in the spun fiber that are difficult or impossible to achieve with conventional spun polymers. This polymerization technique is described in commonly owned US Provisional Application entitled "Pre-Composite and Composite Materials, Methods of Manufacture and Uses Thereof" (Serial No. not yet assigned) that has been filed concurrently and is incorporated herein in its entirety by reference.

In order to produce a pre-fiber gel composition and/or material that can be formed into a gel spun fiber, a contemplated pre-fiber gel composition includes: a) at least one polymer and/or monomer-based composition; and b) at least one gelling agent, wherein the gel composition has sufficient viscosity and sufficient cohesiveness upon the mixing of the at least one polymer and/or monomer-based composition and the at least one gelling agent that the composition can be spun into a fiber.

In order to produce a pre-fiber gel composition and/or material that can be formed into a nylon-based gel spun fiber, a contemplated pre-fiber gel composition includes: a) at least one amide-based and/or polyamide-based composition; and b) at least one lactam gelling agent, wherein the gel composition has sufficient viscosity and sufficient cohesiveness upon the mixing of the at least one amide-based or polyamide-based polymer and the at least one lactam gelling agent that the composition can be spun into a fiber.

At this point it should be understood that, unless otherwise indicated, all numbers expressing quantities of ingredients, constituents, interaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

In contemplated embodiments, at least one monomer- and/or polymer-based compound is the starting point for the formation of a pre-fiber gel composition and/or material. In other embodiments, at least one amide-based compound and/or polyamide-based compound is the starting point for the formation of a pre-fiber gel composition and/or material. As used herein, the term "compound" means a substance with constant composition that can be broken down into elements by chemical processes. Polyamides and polyamide-based compounds, as the name implies, are polymers that comprise amide monomers. Several contemplated polyamide-based compounds comprise nylon-based compounds, such as nylon-6.

Amides are an important group of nitrogenous compounds and monomers that are used as intermediates and/or building blocks in the production of polymers, textiles, plastics and adhesives. Amide monomers are generally represented by the following formula:

wherein R is an alkyl group, an aryl group, a cyclic alkyl group, an alkenyl group, an arylalkylene group, or any other appropriate group that can be utilized to be a part of an amide compound.

As used herein, the term "monomer" generally refers to any chemical compound that is capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "blockpolymers". The weight-average molecular weight of monomers may vary greatly between about 40 Dalton and 20000 Dalton. However, especially when monomers comprise repetitive building blocks, monomers may have even higher molecular weights. Monomers may also include additional groups, such as groups used for crosslinking, radiolabeling, and/or chemical or environmental protecting.

The term "alkyl" is used herein to mean a branched or a straight-chain saturated hydrocarbon group or substituent of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. In some embodiments, contemplated alkyl groups contain 1 to 12 carbon atoms. The term "cyclic alkyl" means an alkyl compound whose structure is characterized by one or more closed rings. The cyclic alkyl may be mono-, bi-, tri- or polycyclic depending on the number of rings present in the compound. The term "aryl" is used herein to mean a monocyclic aromatic species of 5 to 7 carbon atoms or a compound that is built with monocyclic aromatic species of 5 to 7 carbon atoms and is typically phenyl, naphthalyl, phenanthryl, anthracyl etc. Optionally, these groups are substituted with one to four, more preferably one to two alkyl, alkoxy, hydroxy, and/or nitro substituents.

The term "alkenyl" is used herein to mean a branched or a straight-chain hydrocarbon chain containing from 2 to 24 carbon atoms and at least one double bond. Preferred alkenyl groups herein contain 1 to 12 carbon atoms. The term "alkoxy" is used herein to mean an alkyl group bound through a single, terminal ether linkage; that is, an alkoxy group may be defined as —OR wherein R is an alkyl group, as defined above. The term "arylalkylene" is used herein to mean moieties containing both alkylene and monocyclic aryl species, typically containing less than about 12 carbon atoms in the alkylene portion, and wherein the aryl substituent is bonded to the structure of interest through an alkylene linking group. Exemplary arylalkylene groups have the structure —$(CH_2)_j$-Ar wherein "j" is an integer in the range of 1 to 6 and wherein "Ar" is an aryl species.

At least one gelling agent is provided that is mixed with the at least one monomer-based and/or polymer based composition. In some embodiments, the gelling agent comprises a lactam gelling agent that is mixed and/or blended with the at least one polyamide-based or amide-based compound in order to form a contemplated pre-fiber gel composition. The at least one lactam gelling agent may comprise a caprolactam, such as ε-caprolactam. ε-Caprolactam, also known as aminocaproic lactam and 2-oxohexamethyleneimine, is a compound that is produced in flake and molten forms and is used primarily in the manufacture of nylon-6 products such as those products contemplated herein or other synthetic fibers, plastics, bristles, films, coatings, synthetic leathers, plasticizers and paint vehicles. Caprolactam can also be used as a cross-linking agent for polyurethanes and in the synthesis of the amino acid lysine. A contemplated lactam preparation method is shown herein in Example 1.

Amides, such as caprolactam, can also be produced by reacting a ketone with hydroxylamine to make an oxime, and then using an acid catalyzed rearrangement of the oxime(s), conventionally called the Beckmann rearrangement, to form the amide. Merchant quality caprolactam can be produced by methods described in U.S. patent application Ser. No. 10/251, 335 filed on Sep. 21, 2002, which is commonly owned and herein incorporated in its entirety.

The at least one gelling agent and/or lactam gelling agent may be added in any suitable weight percentage with respect to the other composition constituents, as long as the addition of the gelling agent aids in the production of a pre-fiber gel composition. In a contemplated embodiment, the at least one gelling agent comprises less than 50 weight percent of the composition. In another contemplated embodiment, the at least one gelling agent comprises less than 40 weight percent of the composition. In yet another contemplated embodiment, the at least one gelling agent comprises less than 30 weight percent of the composition. In other contemplated embodiments, the at least one gelling agent comprises less than 20 weight percent of the composition. In yet other contemplated embodiments, the at least one gelling agent comprises less than 10 weight percent of the composition. Also, in some contemplated embodiments, the at least one gelling agent comprises less than 5 weight percent of the composition.

Issues to review as to whether caprolactam/nylon-6 gels would be useful is that they need a suitable viscosity and melt strength for processing. Unexpectedly suitable gels can be prepared over a wide range of concentrations from below 5 wt. % caprolactam to at least 50 wt. %. These gels proved remarkably easy to spin into fibers on conventional melt-spinning equipment and at drawing/take-up speeds comparable to commercial melt spinning. Gel polymers can be processed at lower temperatures than simple, neat melts. This feature can be exploited to process higher molecular weight nylon-6 without undue increases in operating temperatures.

More significantly, the melt strength was unexpectedly good (exhibited by the ability to spin gel at high speed) over the wide range of both caprolactam concentration and processing temperature (from significantly below the normal melt processing temperature to well above it). In many ways, the nylon gel has superior processability over plain melted nylon. This is in contrast to gel spun polyethylene were the gel must be spun at low linear speed prior to removal of the solvent.

The unexpectedly good processability of nylon/caprolactam gels provides greater flexibility in manufacturing products. The ability to spin the gel at high speeds suggest that nylon gel products can be manufactured with productivity comparable to melt processing. The excellent melt strength of the gels also allow the polymer to be highly shaped or drawn prior to solvent removal; or, only lightly processed, the caprolactam removed, and then post-processed to achieved the desired combination of properties.

The caprolactam itself has advantages as a gelling solvent. It is relatively inexpensive, low volatility, and non-hazardous with favorable industrial hygiene properties. The caprolactam can be extracted from the polymer with water and then easily recovered for re-use.

In addition, methods are provided herein that teach that the production of a pre-fiber gel composition, comprising: a) providing at least one monomer- and/or polymer-based compound; b) providing at least one gelling agent; and c) mixing the at least one monomer- and/or polymer-based compound and the at least one gelling agent such that there is sufficient viscosity and sufficient cohesiveness in the composition so that it can be spun into a fiber. In some embodiments, mixing comprises any suitable method, including blending or extruding. In yet other embodiments, the at least part of the at least one gelling agent may be removed after the mixing step.

In addition, methods are provided herein that teach that the production of a pre-fiber gel composition, comprising: a) providing at least one amide-based compound; b) providing at least one lactam gelling agent; and c) mixing the at least one amide-based polymer and the at least one lactam gelling agent such that there is sufficient viscosity and sufficient cohesiveness in the composition so that it can be spun into a fiber. In some embodiments, mixing comprises any suitable method, including blending or extruding. In yet other embodiments, the at least part of the at least one lactam gelling agent may be removed after the mixing step.

The at least one polymer and/or monomer based compound, the at least one amide-based compound, the at least one gelling agent and/or at least one lactam gelling agent may be provided by any suitable method, including a) buying at least some of the at least one polymer and/or monomer based compound, the at least one amide-based compound, the at least one gelling agent and/or at least one lactam gelling agent from a supplier or textile mill; b) preparing or producing at least some of the at least one polymer and/or monomer based compound, the at least one amide-based compound, the at least one gelling agent and/or at least one lactam gelling agent in house using chemicals provided by another source and/or c) preparing or producing at least some of the at least one polymer and/or monomer based compound, the at least one amide-based compound, the at least one gelling agent and/or at least one lactam gelling agent in house using chemicals also produced or provided in house or at the location.

During or after the formation of contemplated pre-fiber gel compositions, fiber materials, yarn products and/or carpet products, a thermal energy may be applied to the materials and/or products, wherein the thermal energy comprises a temperature that is at or above the melting point of the constituents, the fiber and/or other heat-active components. The thermal energy can be applied to activate at least some of the plurality of fibers. In some embodiments, activating the fibers comprises forming chemical, such as covalent, ionic or hydrogen and/or physical, such as adhesion, bonds between at least some of the plurality of fibers and at least one of the other components.

The thermal energy may come from any suitable source, including extended/non-point sources, such as a UV-VIS source, an infra-red source, a heat source, both radiative and convective, or a microwave source; or electron sources, such as electron guns or plasma sources. Other suitable energy sources include electron beams, and radiative devices at non-IR wavelengths including x-ray, and gamma ray. Still other suitable energy sources include vibrational sources such as microwave transmitters. In preferred embodiments, the energy source is an extended source. In more preferred embodiments, the energy source is a heat source, such as an atmospheric pressure forced air machine, which can be followed by a steam purge, or a pressurized twist-setting machine. An example of an atmospheric pressure forced air machine is the Suessen® Twist-Setting Machine. Examples of pressurized twist-setting machines are those of the autoclave-type and those manufactured by Superba®.

It should be understood that the thermal energy may be applied consistently or in short bursts. It is also contemplated that the thermal energy may be gradually and continuously applied over a temperature range until the thermal energy is at or above the melting point of the fiber or other heat-active components. For example, the fiber material and/or yarn may be heated by an atmospheric pressure forced air machine at a temperature of about 195° C. for a residence time of about 60 seconds, before the treated fiber material and/or yarn product is tufted. The thermal energy may also be immediately applied at or above the melting point of the binder fiber and/or other heat-active components without any ramp time.

The pre-fiber gel materials contemplated and described herein may be used alone or in combination with other materials and/or products to form any suitable product, including a spun fiber product, a yarn product, a fabric product and/or a carpet product.

EXAMPLES

The pre-fiber gel compositions, fiber materials, yarn products, carpet products and methods used to produce those materials and products, as described in the examples, are for illustrative purpose only and should not, in any way, limit the scope of this invention.

Example 1—Lactam Preparation

Four liters of caprolactam were melted in a convection oven overnight in a covered container. The lactam was poured into a 5 L 3-necked distillation flask with a magnetic stir bar and an electric heating mantle (top and bottom mantles). The distillation column was vacuum jacketed by a 29/42 column and a 10 tray section, a 5 tray section, a splitting distillation head and a condenser. The condenser was held at 50° C. with a heated water circulator. The system had the pressure reduced from 7 mm Hg to 4 mm Hg. Heat was applied and the column was brought to reflux conditions and held for 30 minutes. After 30 minutes for the column to stabilize, the distillation head splitter was activated with a 4 second take off and a 10 second reflux. Slightly less than 1 liter of lactam was distilled off. The heat was turned off and the mantles were removed allowing the lactam in the 5-liter flask to drop to 90° C. before breaking the vacuum on the system. The 5-liter flask was removed and the lactam was poured into 1-liter nalgene beakers and promptly placed into a glove box with a dry nitrogen atmosphere. After cooling overnight, the crystal lactam was transferred to plastic bags and was broken into flake form with a hammer inside the glove box. The lactam was stored inside the dry glove box under house nitrogen until needed for the pre-fiber gel composition formation.

Example 2—Pre-Fiber Gel Composition Formation

Nylon-6 was ground to a fine powder and mixed with a lactam gelling agent, which was in this case—caprolactam. A Braybender mixer was used to mix the nylon and caprolactam at a speed of 60 RPM. Addition time took about 5 minutes and the gel was allowed to mix for 15 minutes after charging at the temperature indicated. The samples were removed while the Braybender was running with a brass wipe stick. The samples were then ground in a Willey mill using a course screen. A weighted amount of each ground gel mix was extracted 16+hours using a jacketed soxlet extractor. The extract was filtered using a folded #54 paper and rinsed into a 100 mL volumetric flask. The extract was brought to volume with deionized water and then analyzed by Gas Chromatography for % lactam using a Carbowax column.

| GEL MIX | BRAYBENDER TEMPERATURE | WEIGHT EXTRACTED | VOLUME | % LACTAM IN EXTRACT | % LACTAM IN GEL BY GC |
| --- | --- | --- | --- | --- | --- |
| 5% Lactam | 225 | 8.9041 | 100 | 0.2867 | 3.22 |
| 10% Lactam | 220 | 9.0031 | 100 | 0.4204 | 4.67 |
| 15% Lactam | 215 | 9.7892 | 100 | 0.9114 | 9.31 |
| 20% Lactam | 210 | 8.6867 | 100 | 0.966 | 11.12 |
| 30% Lactam | 205 | 8.7811 | 100 | 1.8124 | 20.64 |
| 40% Lactam | 194 | 7.6208 | 100 | 2.3396 | 30.7 |

The resulting gels were gel spun on an Rx-2 (what is this machine?). The gels spun into a fiber product surprisingly well and packages of fiber were able to be prepared at most conventional spinning conditions. Furthermore, it was observed that extruder temperature could be dropped below conventional conditions for neat polymers, given that the gel compositions allowed for lower extruder pressures. Tables 1-5, shown below, give summaries of several of the spinning conditions utilized in these Examples.

Thus, specific embodiments and applications of pre-fiber gel compositions and materials, their manufacture and uses thereof have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

TABLE 1

Nylon Gel Spinning:
RXT-2 UNIT
CHANGE NUMBERS WHERE IT IS BLUE COLOR

| | | | | |
|---|---|---|---|---|
| MINIMUM PUMP RPM | 8 | | | |
| MAXIMUM PUMP RPM | 40 | | | |
| PUMP SIZE(CC/REV.) | 1.16 | | | |
| NUMBER OF FILAMENTS | 14 | | | |
| PUMP SPEED(RPM) | 19.7 | | | |
| POLYMER DENSITY(GM/CC) | 0.98 | | | |
| THRU-PUT(LBS/HR) | 2.95969 | | | |
| THRU-PUT PER FIL(LBS/HR) | 0.21141 | THRU-PUT PER FIL(GMS/MIN) | | 1.5982 |
| THRU-PUT(GMS/MIN) | 22.395 | THRU-PUT(GMS/MIN) | | 22.395 |
| THRU-PUT PER FIL(GMS/MIN) | 1.59964 | | | |
| TAKE-UP SPEED (Meter/min) | 3000 | FROM FT/MIN TO M/MIN | | 0.3048 |
| DPF GMS @TAKE-UP ROLL (UNDRAWN) | 4.79892 | | | |
| DTEX PER FIL GMS @TAKE-UP ROLL (UNDRAWN) | 5.33213 | | | |
| FIL DIAMETER, MICRONS (UNDRAWN) | 22.1859 | | | 22.186 |
| FIL DIAMETER, mm (UNDRAWN) | 0.02219 | | | |
| TAKE-UP SPEED (FEET/min) | 9842.52 | | | |

| Spinnerette | diameter | length | L/D | AREA |
|---|---|---|---|---|
| INCH | 0.03 | 0.09 | 3 | 0.0007065 |
| CM | 0.0762 | 0.2286 | 3 | 0.00455806 |
| YARN DENIER @TAKE-UP ROLL (GMS) | 67.1849 | | | |
| FLOW RATE(CC/MIN) | 22.852 | | | |
| JET VELOCITY (CM/MIN) | 5013.54 | | | |
| JET VELOCITY (meter/MIN) | 50.1354 | DR @ (TAKE-UP ROLL) | | 59.8379407 |
| SPIN. CAPILLARY RADIUS (FT) | 0.0025 | | | |
| SPIN. CAPILLARY LENGTH (FT) | 0.0075 | | | |
| THRU-PUT PER FIL(LBm/HR) | 0.21141 | | | |
| DENSITY(LBm/FT3) | 61.1814 | | | |
| FLOW RATE(FT3/SEC.) | 9.6E−07 | | | |
| VISCOSITY (POISE) | 3143.9 | | | |
| VISCOSITY (LBf.SEC/FT2) | 6.56634 | | | |
| DELTA PRESSURE(PSI) | 21.4101 | | | |
| Stack Draw (calc. From sprt hole dia. And fil dia.) | 34.3462 | | | |
| FINAL REQUIRE DENIER AFTER DRAWIN | 10 | | | |
| DRAWING DRAW RATIO | 0.47989 | | | |

TABLE 2

| | Starting Conditions | Sample I.D. | | | |
|---|---|---|---|---|---|
| | | #1 | #2 | #3 | #4 |
| POLYMER TYPE | MBM | MBM | | MBM 10% Lactam | MBM 10% Lactam |
| Feeder Setting | 2.96 | 2.96 | 2.96 | 2.96 | 2.96 |
| Date | Oct. 23, 2002 | Oct. 23, 2002 | Oct. 23, 2002 | Oct. 23, 2002 | Oct. 23, 2002 |
| water on feeding zone | on | on | on | on | on |
| zone 1 Temp. (deg c.) | 245 | 270 | 250 | 250 | 245 |
| zone 2 Temp. (deg c.) | 245 | 280 | 250 | 250 | 245 |
| zone 3 Temp. (deg c.) | 245 | 280 | 250 | 250 | 245 |
| zone 4 Temp. (deg c.) | 245 | 280 | 250 | 250 | 245 |
| zone 5 Temp. (deg c.) | 245 | 280 | 250 | 250 | 245 |
| zone 6 Temp. (deg c.) | 245 | 280 | 250 | 250 | 245 |
| zone 7 Temp. (deg c.) | 245 | 280 | 250 | 250 | 245 |
| 8 Connecting Plate Temp. (deg. C.) | 245 | 280 | 250 | 250 | 245 |
| 9 Block Temp. (deg. C.) | 245 | 280 | 250 | 250 | 245 |
| 10 Spin Pump Temp. (deg. C.) | 245 | 280 | 250 | 250 | 245 |
| 11 Top Cap (deg. C.) | 245 | 280 | 250 | 250 | 245 |
| 12 Spin Pack Temp. (deg. C.) | 245 | 280 | 250 | 250 | 245 |
| Top Heated Sleeve Length (Inches) | xxxx | xxxx | xxxx | xxxx | xxxx |
| Top Heated Sleeve Temp. (deg. c.) | xxxx | xxxx | xxxx | xxxx | xxxx |
| Bottom Heated Sleeve Length (Inches) | xxxx | xxxx | xxxx | xxxx | xxxx |

TABLE 2-continued

| | | | | | |
|---|---|---|---|---|---|
| Bottom Heated Sleeve Temp. (deg. c.) | xxxx | xxxx | xxxx | xxxx | xxxx |
| Barrel Melt Temp. (deg. c.) | 252 | 288 | 256 | 257 | 251 |
| Melt Pump Inlet Pressure (psi) | ???? | 420 | 10 | 200 | 10 |
| Melt Pump Outlet Pressure (psi) | ???? | 200 | 470 | 250 | 250 |
| Extruder (rpm) | 200 | 200 | 200 | 200 | 200 |
| Spinneret: no. of holes/Shape | 14 R | 14 R | 14 R | 14 R | 14 R |
| Spinneret: capilary diameter & depth | .024 × 0.072 | .024 × 0.072 | .024 × 0.072 | .024 × 0.072 | .024 × 0.072 |
| Metering pump size (cc/rev) | 1.16 | 1.16 | 1.16 | 1.16 | 1.16 |
| Metering pump (rpm) | 16.7 | 19.3 | 19.8 | 19.8 | 19.8 |
| Thruput (lbs/hr) | 2.97 | 2.97 | 2.97 | 2.97 | 2.97 |
| Filter type | STD SCREEN | STD SCREEN | STD SCREEN | STD SCREEN | STD SCREEN |
| Monomer Exhaust Reading (inches water) | TBD | TBD | TBD | TBD | TBD |
| Quench air Flow rate (CF/M) | 14.2 | 14.2 | 14.2 | 14.2 | 14.2 |
| Qench air Temp. (deg. c.) | 19 | 19 | 19 | 19 | 19 |
| Quench air Humidity % | 40.8 | 40.8 | 40.8 | 40.8 | 40.8 |
| % Torque | 70 | 25 | 29 | 22 | 20 |
| Nitrogen in Hoper | 3 | 3 | 3 | 3 | 3 |
| Need: polymer chips moisture | Yes | | | | |
| Need: Free fall samples for FAV, COOH | Yes | Yes | Yes | Yes | Yes |

| | | Sample I.D. | | | |
|---|---|---|---|---|---|
| | | #5 | #6 | #7 | #8 |
| POLYMER TYPE | | MBM 10% Lactam | MBM 10% Lactam | MBM 10% Lactam | MBM 10% Lactam |
| Feeder Setting | | 2.96 | 2.96 | 2.96 | 2.96 |
| Date | | Oct. 23, 2002 | Oct. 23, 2002 | Oct. 23, 2002 | Oct. 23, 2002 |
| water on feeding zone | | on | on | on | on |
| zone 1 Temp. (deg c.) | | 240 | 235 | 230 | 225 |
| zone 2 Temp. (deg c.) | | 240 | 235 | 230 | 225 |
| zone 3 Temp. (deg c.) | | 240 | 235 | 230 | 225 |
| zone 4 Temp. (deg c.) | | 240 | 235 | 230 | 225 |
| zone 5 Temp. (deg c.) | | 240 | 235 | 230 | 225 |
| zone 6 Temp. (deg c.) | | 240 | 235 | 230 | 225 |
| zone 7 Temp. (deg c.) | | 240 | 235 | 230 | 225 |
| 8 Connecting Plate Temp. (deg. C.) | | 240 | 235 | 230 | 225 |
| 9 Block Temp. (deg. C.) | | 240 | 235 | 230 | 225 |
| 10 Spin Pump Temp. (deg. C.) | | 240 | 235 | 230 | 225 |
| 11 Top Cap (deg. C.) | | 240 | 235 | 230 | 225 |
| 12 Spin Pack Temp. (deg. C.) | | 240 | 235 | 230 | 225 |
| Top Heated Sleeve Length (Inches) | | xxxx | xxxx | xxxx | xxxx |
| Top Heated Sleeve Temp. (deg. c.) | | xxxx | xxxx | xxxx | xxxx |
| Bottom Heated Sleeve Length (Inches) | | xxxx | xxxx | xxxx | xxxx |
| Bottom Heated Sleeve Temp. (deg. c.) | | xxxx | xxxx | xxxx | xxxx |
| Barrel Melt Temp. (deg. c.) | | 246 | 240 | 235 | 231 |
| Melt Pump Inlet Pressure (psi) | | 10 | 10 | 10 | 10 |
| Melt Pump Outlet Pressure (psi) | | 310 | 260 | 360 | 400 |
| Extruder (rpm) | | 200 | 200 | 200 | 200 |
| Spinneret: no. of holes/Shape | | 14 R | 14 R | 14 R | 14 R |
| Spinneret: capilary diameter & depth | | .024 × 0.072 | .024 × 0.072 | .024 × 0.072 | .024 × 0.072 |
| Metering pump size (cc/rev) | | 1.16 | 1.16 | 1.16 | 1.16 |
| Metering pump (rpm) | | 19.8 | 19.7 | 19.7 | 19.7 |
| Thruput (lbs/hr) | | 2.97 | 2.97 | 2.97 | 2.97 |
| Filter type | | STD SCREEN | STD SCREEN | STD SCREEN | STD SCREEN |
| Monomer Exhaust Reading (inches water) | | TBD | | | |
| Quench air Flow rate (CF/M) | | 14.2 | 15.5 | 15.9 | 14.9 |
| Qench air Temp. (deg. c.) | | 19 | 19.3 | 19.6 | 19.7 |
| Quench air Humidity % | | 40.8 | 39.8 | 39.5 | 39 |
| % Torque | | 21 | 20 | 24 | 24 |
| Nitrogen in Hoper | | 3 | 3 | 3 | 3 |
| Need: polymer chips moisture | | | | yes | |
| Need: Free fall samples for FAV, COOH | | Yes | Yes | | |

TABLE 3

| | Sample I.D. | | | | |
|---|---|---|---|---|---|
| | #9 | #10 | #11 | #12 | #13 |
| POLYMER TYPE | BHS | BHS 10% Lactam | BHS 10% Lactam | BHS 10% Lactam | BHS 10% Lactam |
| Feeder Setting | 2.96 | 2.96 | 2.96 | 2.96 | 2.96 |
| water on feeding zone | on | on | on | on | on |
| zone 1 Temp. (deg c.) | 252 | 252 | 247 | 242 | 237 |
| zone 2 Temp. (deg c.) | 252 | 252 | 247 | 242 | 237 |
| zone 3 Temp. (deg c.) | 252 | 252 | 247 | 242 | 237 |

TABLE 3-continued

| | | | | | |
|---|---|---|---|---|---|
| zone 4 Temp. (deg c.) | 252 | 252 | 247 | 242 | 237 |
| zone 5 Temp. (deg c.) | 252 | 252 | 247 | 242 | 237 |
| zone 6 Temp. (deg c.) | 252 | 252 | 247 | 242 | 237 |
| zone 7 Temp. (deg c.) | 252 | 252 | 247 | 242 | 237 |
| 8 Connecting Plate Temp. (deg. C.) | 232 | 252 | 247 | 242 | 237 |
| 9 Block Temp. (deg. C.) | 252 | 252 | 247 | 242 | 237 |
| 10 Spin Pump Temp. (deg. C.) | 252 | 252 | 247 | 242 | 237 |
| 11 Top Cap (deg. C.) | 252 | 252 | 247 | 242 | 237 |
| 12 Spin Pack Temp. (deg. C.) | 252 | 252 | 247 | 242 | 237 |
| Top Heated Sleeve Length (Inches) | xxxx | xxxx | xxxx | xxxx | xxxx |
| Top Heated Sleeve Temp. (deg. c.) | xxxx | xxxx | xxxx | xxxx | xxxx |
| Bottom Heated Sleeve Length (Inches) | xxxx | xxxx | xxxx | xxxx | xxxx |
| Bottom Heated Sleeve Temp. (deg. c.) | xxxx | xxxx | xxxx | xxxx | xxxx |
| Barrel Melt Temp. (deg. c.) | 259 | 260 | 254 | 249 | 245 |
| Melt Pump Inlet Pressure (psi) | 40 | 90 | 250 | 280 | 180 |
| Melt Pump Outlet Pressure (psi) | 970 | 520 | 570 | 610 | 740 |
| Extruder (rpm) | 200 | 200 | 200 | 200 | 200 |
| Spinneret: no. of holes/Shape | 14 R | 14 R | 14 R | 14 R | 14 R |
| Spinneret: capilary diameter & depth | .024 × 0.072 | .024 × 0.072 | .024 × 0.072 | .024 × 0.072 | .024 × 0.072 |
| Metering pump size (cc/rev) | 1.16 | 1.16 | 1.16 | 1.16 | 1.16 |
| Metering pump (rpm) | 19.7 | 19.7 | 19.7 | 19.7 | 19.7 |
| Thruput (lbs/hr) | 2.97 | 2.97 | 2.97 | 2.97 | 2.97 |
| Filter type | STD SCREEN | STD SCREEN | STD SCREEN | STD SCREEN | STD SCREEN |
| Monomer Exhaust Reading (inches water) | TBD | TBD | TBD | TBD | TBD |
| Quench air Flow rate (CF/M) | 14.6 | 14.5 | 14.6 | 14.9 | 15 |
| Qench air Temp. (deg. c.) | 19.5 | 18.9 | 19.2 | 19.2 | 18.7 |
| Quench air Humidity % | 38.7 | 39.3 | 39.7 | 41.6 | 39.7 |
| % Torque | 42 | 27 | 29 | 30 | 29 |
| Nitrogen in Hoper | 3 | 3 | 3 | 3 | 3 |
| Need: polymer chips moisture | | | | | |
| Need: Free fall samples for FAV, COOH | | | | | |

| | Sample I.D. | | | |
|---|---|---|---|---|
| | #14 | #15 | #16 | #17 |
| POLYMER TYPE | BHS 10% Lactam | BHS 10% Lactam | 135 | 135 10% Lactam |
| Feeder Setting | 2.96 | 2.96 | 2.96 | 2.96 |
| water on feeding zone | on | on | on | on |
| zone 1 Temp. (deg c.) | 232 | 227 | 260 | 260 |
| zone 2 Temp. (deg c.) | 232 | 227 | 260 | 260 |
| zone 3 Temp. (deg c.) | 232 | 227 | 260 | 260 |
| zone 4 Temp. (deg c.) | 232 | 227 | 260 | 260 |
| zone 5 Temp. (deg c.) | 232 | 227 | 260 | 260 |
| zone 6 Temp. (deg c.) | 232 | 227 | 260 | 260 |
| zone 7 Temp. (deg c.) | 232 | 227 | 260 | 260 |
| 8 Connecting Plate Temp. (deg. C.) | 232 | 227 | 260 | 260 |
| 9 Block Temp. (deg. C.) | 232 | 227 | 260 | 260 |
| 10 Spin Pump Temp. (deg. C.) | 232 | 227 | 260 | 260 |
| 11 Top Cap (deg. C.) | 232 | 227 | 260 | 260 |
| 12 Spin Pack Temp. (deg. C.) | 232 | 227 | 260 | 260 |
| Top Heated Sleeve Length (Inches) | xxxx | xxxx | xxxx | xxxx |
| Top Heated Sleeve Temp. (deg. c.) | xxxx | xxxx | xxxx | xxxx |
| Bottom Heated Sleeve Length (Inches) | xxxx | xxxx | xxxx | xxxx |
| Bottom Heated Sleeve Temp. (deg. c.) | xxxx | xxxx | xxxx | xxxx |
| Barrel Melt Temp. (deg. c.) | 240 | 235 | 270 | 269 |
| Melt Pump Inlet Pressure (psi) | 50 | 70 | 1200 | 300 |
| Melt Pump Outlet Pressure (psi) | 790 | 840 | 1600 | 1040 |
| Extruder (rpm) | 200 | 200 | 200 | 200 |
| Spinneret: no. of holes/Shape | 14 R | 14 R | 14 R | 14 R |
| Spinneret: capilary diameter & depth | .024 × 0.072 | .024 × 0.072 | .024 × 0.072 | .024 × 0.072 |
| Metering pump size (cc/rev) | 1.16 | 1.16 | 1.16 | 1.16 |
| Metering pump (rpm) | 19.7 | 19.7 | 19.7 | 19.7 |
| Thruput (lbs/hr) | 2.97 | 2.97 | 2.97 | 2.97 |
| Filter type | STD SCREEN | STD SCREEN | STD SCREEN | STD SCREEN |
| Monomer Exhaust Reading (inches water) | TBD | | | |
| Quench air Flow rate (CF/M) | 14.6 | 14.9 | 14.5 | 15.1 |
| Qench air Temp. (deg. c.) | 19 | 19.4 | 18.5 | 19.2 |
| Quench air Humidity % | 40.3 | 39.4 | 39.6 | 41.1 |
| % Torque | 30 | 29 | 56 | 37 |
| Nitrogen in Hoper | 3 | 3 | 3 | 3 |
| Need: polymer chips moisture | | | | |
| Need: Free fall samples for FAV, COOH | | | | |

TABLE 4

| | Sample I.D. | | | | |
|---|---|---|---|---|---|
| | #18 | #19 | #20 | #21 | #22 |
| POLYMER TYPE | 135 10% Lactam | 135 10% Lactam | 135 10% Lactam | 135 10% Lactam | 135 10% Lactam |
| Feeder Setting | 2.96 | 2.96 | 2.96 | 2.96 | 2.96 |
| Date | Oct. 24, 2002 | Oct. 24, 2002 | Oct. 24, 2002 | Oct. 24, 2002 | Oct. 24, 2002 |
| water on feeding zone | on | on | on | on | on |
| zone 1 Temp. (deg c.) | 255 | 250 | 245 | 240 | 235 |
| zone 2 Temp. (deg c.) | 255 | 250 | 245 | 240 | 235 |
| zone 3 Temp. (deg c.) | 255 | 250 | 245 | 240 | 235 |
| zone 4 Temp. (deg c.) | 255 | 250 | 245 | 240 | 235 |
| zone 5 Temp. (deg c.) | 255 | 250 | 245 | 240 | 235 |
| zone 6 Temp. (deg c.) | 255 | 250 | 245 | 240 | 235 |
| zone 7 Temp. (deg c.) | 255 | 250 | 245 | 240 | 235 |
| 8 Connecting Plate Temp. (deg. C.) | 255 | 250 | 245 | 240 | 235 |
| 9 Block Temp. (deg. C.) | 255 | 250 | 245 | 240 | 235 |
| 10 Spin Pump Temp. (deg. C.) | 255 | 250 | 245 | 240 | 235 |
| 11 Top Cap (deg. C.) | 255 | 250 | 245 | 240 | 235 |
| 12 Spin Pack Temp. (deg. C.) | 255 | 250 | 245 | 240 | 235 |
| Top Heated Sleeve Length (Inches) | xxxx | xxxx | xxxx | xxxx | xxxx |
| Top Heated Sleeve Temp. (deg. c.) | xxxx | xxxx | xxxx | xxxx | xxxx |
| Bottom Heated Sleeve Length (Inches) | xxxx | xxxx | xxxx | xxxx | xxxx |
| Bottom Heated Sleeve Temp. (deg. c.) | xxxx | xxxx | xxxx | xxxx | xxxx |
| Barrel Melt Temp. (deg. c.) | 264 | 259 | 253 | 248 | 243 |
| Melt Pump Inlet Pressure (psi) | 630 | 470 | 450 | 630 | 600 |
| Melt Pump Outlet Pressure (psi) | 1080 | 1140 | 1280 | 1280 | 1330 |
| Extruder (rpm) | 200 | 200 | 200 | 200 | 200 |
| Spinneret: no. of holes/Shape | 14 R | 14 R | 14 R | 14 R | 14 R |
| Spinneret: capilary diameter & depth | .024 × 0.072 | .024 × 0.072 | .024 × 0.072 | .024 × 0.072 | .024 × 0.072 |
| Metering pump size (cc/rev) | 1.16 | 1.16 | 1.16 | 1.16 | 1.16 |
| Metering pump (rpm) | 19.7 | 19.7 | 19.7 | 19.7 | 19.7 |
| Thruput (lbs/hr) | 2.97 | 2.97 | 2.97 | 2.97 | 2.97 |
| Filter type | STD SCREEN | STD SCREEN | STD SCREEN | STD SCREEN | STD SCREEN |
| Monomer Exhaust Reading (inches water) | TBD | TBD | TBD | TBD | TBD |
| Quench air Flow rate (CF/M) | 15.2 | 14.9 | 14.5 | 14.4 | 14.9 |
| Qench air Temp. (deg. c.) | 20.1 | 19.5 | 18.7 | 19 | 18.9 |
| Quench air Humidity % | 39.4 | 40.7 | 39.7 | 40.1 | 41.3 |
| % Torque | 39 | 38 | 40 | 37 | 39 |
| Nitrogen in Hoper | 3 | 3 | 3 | 3 | 3 |
| Need: polymer chips moisture | | | | | |
| Need: Free fall sample for FAV, COOH | | | | | |

| | Sample I.D. | | | |
|---|---|---|---|---|
| | #23 | #24 | #25 | #26 |
| POLYMER TYPE | 135 10% Lactam | 135 10% Lactam | 195 | 195 10% Lactam |
| Feeder Setting | 2.96 | 2.96 | 2.96 | 2.96 |
| Date | Oct. 24, 2002 | Oct. 24, 2002 | Oct. 24, 2002 | Oct. 24, 2002 |
| water on feeding zone | on | on | on | on |
| zone 1 Temp. (deg c.) | 230 | 225 | 300/289 | 290/273 |
| zone 2 Temp. (deg c.) | 230 | 225 | 300 | 290 |
| zone 3 Temp. (deg c.) | 230 | 225 | 300 | 290 |
| zone 4 Temp. (deg c.) | 230 | 225 | 300 | 290 |
| zone 5 Temp. (deg c.) | 230 | 225 | 300 | 290 |
| zone 6 Temp. (deg c.) | 230 | 225 | 300 | 290 |
| zone 7 Temp. (deg c.) | 230 | 225 | 300 | 290 |
| 8 Connecting Plate Temp. (deg. C.) | 230 | 225 | 300 | 290 |
| 9 Block Temp. (deg. C.) | 230 | 225 | 300 | 290 |
| 10 Spin Pump Temp. (deg. C.) | 230 | 225 | 300 | 290 |
| 11 Top Cap (deg. C.) | 230 | 225 | 300 | 290 |
| 12 Spin Pack Temp. (deg. C.) | 230 | 225 | 300/300 | 290 |
| Top Heated Sleeve Length (Inches) | xxxx | xxxx | xxxx | xxxx |
| Top Heated Sleeve Temp. (deg. c.) | xxxx | xxxx | xxxx | xxxx |
| Bottom Heated Sleeve Length (Inches) | xxxx | xxxx | xxxx | xxxx |
| Bottom Heated Sleeve Temp. (deg. c.) | xxxx | xxxx | xxxx | xxxx |
| Barrel Melt Temp. (deg. c.) | 238 | 232 | 312 | 299 |
| Melt Pump Inlet Pressure (psi) | 580 | 190 | 1480 | 1080 |
| Melt Pump Outlet Pressure (psi) | 1480 | 1700 | 1290 | 790 |
| Extruder (rpm) | 200 | 200 | 200 | 200 |
| Spinneret: no. of holes/Shape | 14 R | 14 R | 14 R | 14 R |
| Spinneret: capilary diameter & depth | .024 × 0.072 | .024 × 0.072 | .024 × 0.072 | .024 × 0.072 |
| Metering pump size (cc/rev) | 1.16 | 1.16 | 1.16 | 1.16 |
| Metering pump (rpm) | 19.7 | 19.7 | 19.7 | 19.7 |
| Thruput (lbs/hr) | 2.97 | 2.97 | 2.97 | 2.97 |
| Filter type | STD SCREEN | STD SCREEN | STD SCREEN | STD SCREEN |
| Monomer Exhaust Reading (inches water) | TBD | | | |

TABLE 4-continued

|  | | | | |
|---|---|---|---|---|
| Quench air Flow rate (CF/M) | 14 | 14.2 | 14.6 | 14.8 |
| Qench air Temp. (deg c.) | 19.1 | 18.7 | 18.9 | 19.5 |
| Quench air Humidity % | 38.7 | 39.1 | 96.8 | 39.1 |
| % Torque | 40 | 42 | 52 | 38 |
| Nitrogen in Hoper | 3 | 3 | 3 | 3 |
| Need: polymer chips moisture | | | | |
| Need: Free fall sample for FAV, COOH | | | | |

TABLE 5

| Sample I.D. | #27 | #28 | #29 | #30 |
|---|---|---|---|---|
| POLYMER TYPE | 195 10% Lactam | 195 10% Lactam | 195 10% Lactam | 195 10% Lactam |
| Feeder Setting | 2.96 | 2.96 | 2.96 | 2.96 |
| Date | Oct. 24, 2002 | Oct. 24, 2002 | Oct. 24, 2002 | Oct. 24, 2002 |
| water on feeding zone | on | on | on | on |
| zone 1 Temp. (deg c.) | 285/270 | 280/266 | 275/263 | 270/258 |
| zone 2 Temp. (deg c.) | 285 | 280 | 275 | 270 |
| zone 3 Temp. (deg c.) | 285 | 280 | 275 | 270 |
| zone 4 Temp. (deg c.) | 285 | 280 | 275 | 270 |
| zone 5 Temp. (deg c.) | 285 | 280 | 275 | 270 |
| zone 6 Temp. (deg c.) | 285 | 280 | 275 | 270 |
| zone 7 Temp. (deg c.) | 285 | 280 | 275 | 270 |
| 8 Connecting Plate Temp. (deg. C.) | 285 | 280 | 275 | 270 |
| 9 Block Temp. (deg. C.) | 285 | 280 | 275 | 270 |
| 10 Spin Pump Temp. (deg. C.) | 285 | 280 | 275 | 270 |
| 11 Top Cap (deg. C.) | 285 | 280 | 275 | 270 |
| 12 Spin Pack Temp. (deg. C.) | 285 | 280 | 275 | 270 |
| Top Heated Sleeve Length (Inches) | xxxx | xxxx | xxxx | xxxx |
| Top Heated Sleeve Temp. (deg. c.) | xxxx | xxxx | xxxx | xxxx |
| Bottom Heated Sleeve Length (Inches) | xxxx | xxxx | xxxx | xxxx |
| Bottom Heated Sleeve Temp. (deg. c.) | xxxx | xxxx | xxxx | xxxx |
| Barrel Melt Temp. (deg. c.) | 296 | 289 | 284 | 279 |
| Melt Pump Inlet Pressure (psi) | 1250 | 50 | 860 | 1060 |
| Melt Pump Outlet Pressure (psi) | 860 | 890 | 970 | 1100 |
| Extruder (rpm) | 200 | 200 | 200 | 200 |
| Spinneret: no. of holes/Shape | 14 R | 14 R | 14 R | 14 R |
| Spinneret: capilary diameter & depth | .024 × 0.072 | .024 × 0.072 | .024 × 0.072 | .024 × 0.072 |
| Metering pump size (cc/rev) | 1.16 | 1.16 | 1.16 | 1.16 |
| Metering pump (rpm) | 19.7 | 19.7 | 19.7 | 19.7 |
| Thruput (lbs/hr) | 2.97 | 2.97 | 2.97 | 2.97 |
| Filter type | STD SCREEN | STD SCREEN | STD SCREEN | STD SCREEN |
| Monomer Exhaust Reading (inches water) | open | open | open | open |
| Quench air Flow rate (CF/M) | 14.7 | 14.7 | 14.2 | 13.9 |
| Qench air Temp. (deg. c.) | 19.2 | 19.7 | 20 | 18.7 |
| Quench air Humidity % | 46.1 | 41.5 | 43.1 | 39.4 |
| % Torque | 41 | 28 | 37 | 41 |
| Nitrogen In Hoper | 3 | 3 | 3 | 3 |
| Need: polymer chips moisture | | | | |
| Need: Free fall samples for FAV, COOH | | | | |

I claim:

1. A pre-fiber gel composition, comprising:
   at least one amide-based polymer; and
   from 5 to at least 50 weight percent of at least one lactam gelling agent in the composition to form a polymer gel material, wherein the polymer gel material has sufficient viscosity and sufficient cohesiveness upon the mixing of the at least one amide-based polymer and the at least one lactam gelling agent that the material can be spun into a fiber.

2. The pre-fiber composition of claim 1, wherein the at least one amide-based polymer comprises a nylon compound.

3. The pre-fiber composition of claim 2, wherein the nylon compound comprises nylon-6.

4. The pre-fiber composition of claim 1, wherein the at least one lactam gelling agent comprises caprolactam.

5. The pre-fiber composition of claim 1, wherein the at least one lactam gelling agent comprises less than 50 weight percent of the composition.

6. The pre-fiber composition of claim 5, wherein the at least one lactam gelling agent comprises less than 40 weight percent of the composition.

7. The pre-fiber composition of claim 6, wherein the at least one lactam gelling agent comprises less than 30 weight percent of the composition.

8. The pre-fiber composition of claim 7, wherein the at least one lactam gelling agent comprises less than 20 weight percent of the composition.

9. A spun fiber comprising the gel composition of claim 1.

10. A carpet product comprising the spun fiber of claim 9.

11. A method of producing a pre-fiber gel composition, comprising:
    providing at least one amide-based compound;
    providing from 5 to at least 50 weight percent of at least one lactam gelling agent; and
    mixing the at least one amide-based polymer and the at least one lactam gelling agent to form a polymer gel material, such that there is sufficient viscosity and sufficient cohesiveness in the material so that it can be spun into a fiber.

12. The method of claim 11, wherein the at least one amide-based polymer comprises a nylon compound.

13. The method of claim 12, wherein the nylon compound comprises nylon-6.

14. The method of claim 11, wherein the at least one lactam gelling agent comprises caprolactam.

15. The method of claim 11, wherein the at least one lactam gelling agent comprises less than 50 weight percent of the composition.

16. The method of claim 15, wherein the at least one lactam gelling agent comprises less than 40 weight percent of the composition.

17. The method of claim 16, wherein the at least one lactam gelling agent comprises less than 30 weight percent of the composition.

18. The method of claim 17, wherein the at least one lactam gelling agent comprises less than 20 weight percent of the composition.

19. The method of claim 11, wherein mixing comprises blending.

20. The method of claim 11, wherein mixing comprises extruding.

21. The method of claim 11, further comprising removing at least part of the at least one lactam gelling agent after the mixing step.

* * * * *